United States Patent [19]
Eyer et al.

[11] Patent Number: 5,671,276
[45] Date of Patent: Sep. 23, 1997

[54] METHOD AND APPARATUS FOR IMPULSE PURCHASING OF PACKAGED INFORMATION SERVICES

[75] Inventors: Mark K. Eyer, San Diego; Allen Shumate, Poway, both of Calif.

[73] Assignee: General Instrument Corporation of Delaware, Chicago, Ill.

[21] Appl. No.: 493,364

[22] Filed: Jul. 21, 1995

[51] Int. Cl.⁶ .................... H04L 9/00; H04N 7/167
[52] U.S. Cl. .................. 380/4; 380/3; 380/5; 380/9; 380/10; 380/20; 380/49
[58] Field of Search .................. 380/3, 4, 9, 10, 380/49, 50, 59, 20, 5, 23, 25; 348/13

[56] References Cited

U.S. PATENT DOCUMENTS

| | | | |
|---|---|---|---|
| 4,866,770 | 9/1989 | Seth-Smith et al. | 380/20 |
| 4,901,367 | 2/1990 | Nicholson | 380/10 X |
| 5,023,907 | 6/1991 | Johnson et al. | 380/4 |
| 5,181,107 | 1/1993 | Rhoades | 348/13 |

*Primary Examiner*—Bernarr E. Gregory
*Attorney, Agent, or Firm*—Barry R. Lipsitz; Ralph F. Hoppin

[57] ABSTRACT

Impulse purchasing is provided for packages of services offered to consumers via an information network. A plurality of services is offered for individual purchase on an impulse basis via a user terminal coupled to the information network. The plurality of services is offered for purchase as a package on terms that may be more favorable than when the services are purchased individually. Upon purchase of a package, a package record is established for access by the user terminal. The package record provides cryptographically secure access to services provided in the package during a defined time period over which the package is valid.

22 Claims, 4 Drawing Sheets

METHOD AND APPARATUS FOR IMPULSE PURCHASING OF PACKAGED INFORMATION SERVICES

BACKGROUND OF THE INVENTION

The present invention relates to communications networks such as cable television, satellite television and computer networks over which services are available for a fee, and more particularly to a method and apparatus for allowing packages of services to be purchased from such networks on an impulse basis.

Cable and satellite television networks where video services are available for a fee are well known. Also well known are computer network services such as CompuServe, Prodigy, America On-Line, Dialog Information Service, and others where entertainment, databases, banking and shopping services can be accessed and E-mail and the like can be communicated, all for a fee. In the past, some communication networks have provided individual services on an impulse purchase basis. For example, "pay-per-view" television movies, in which a viewer can order a movie for viewing upon payment of a fee, are commonly available on cable and satellite television systems. The provision of pay-per-view services is desirable from a consumer's standpoint since the consumer need only pay for those services which are desired and offered at times that the consumer is able to enjoy them. The success of pay-per-view services, whether they be video services or other information services, has prompted system operators and programmers to consider new marketing approaches for such services.

One marketing approach being considered is the ability to offer several programs with a single impulse purchase. The packaging of several programs together can enable a system operator to offer the package at a cost that may be less than the total cost of buying all the programs in the package individually. For example, a programmer may desire to offer Olympics sports coverage via a pay-per-view system. In one marketing scheme, individual events might be offered for sale at a price of ten dollars each. Alternatively, a viewer could instead choose to buy one whole day's of events at a cost of thirty dollars. At the same time, the entire week could be offered for purchase at a total cost of one hundred dollars.

It would be advantageous to provide a scheme for enabling information service providers to offer programs individually or in a variety of different packages. It would be further advantageous to provide such a scheme in which access to such services is provided in a secure manner. The security already provided with respect to the purchase of individual programs must not be compromised by adding the ability to purchase different packages of the individually available services.

The present invention provides various methods and apparatus for enabling packages of services to be offered to consumers via an information network on an impulse purchase basis, having the aforementioned and other advantages.

SUMMARY OF THE INVENTION

A method in accordance with the invention provides packages of services to consumers offered via an information network on an impulse purchase basis. A plurality of services is offered for individual purchase on an impulse basis via a user terminal coupled to the information network. The plurality of services is also offered for purchase on an impulse basis via said user terminal as a package. The package may be provided on more favorable terms than when the services are purchased individually. The package provides the services over a defined time period such as a day, a week or a month. A package record is established upon a purchase of a package. The package record is accessible by the user terminal and provides cryptographically secure access to services provided in the package only during the defined time period during which the package is valid.

In a preferred embodiment, the package record is established and maintained at the user terminal. However, package records could also be established and maintained at a central facility for a population of different user terminals. The latter approach has the disadvantage that additional bandwidth is required to communicate the information in the package record to the individual user terminals.

An expiration countdown can be commenced for a package upon the purchase thereof. The expiration count is based on an available time reference (such as working key epochs used in controlling access to individual programs contained in the package) and precludes the package record from being overwritten by another record until the end of the defined time period. In this manner, once a package is purchased, the package record will remain valid for its entire duration, without the chance of inadvertently overwriting it should additional services or packages be purchased during the lifetime of the package record.

In the illustrated embodiment, the package record includes a cryptographic package key (which can be a portion of a longer key used elsewhere in the system). The services to be provided via purchase of the package are carried in a data stream on the information network. A cryptographic key is derived from the data stream. Access to a service selected by a user is denied if the portion of the cryptographic package key included in the package record does not match a corresponding portion of the cryptographic key derived from the data stream.

The package record can also include a package identifier. The same package identifier is provided for each service in the data stream that is part of the package. The package identifier provided in the package record is used in deriving the portion of the cryptographic package key included in the package record. The package identifier provided for the service selected by the user is used in deriving the cryptographic key from the data stream. If the package identifier in the package record and in the service selected by the user is not the same, the cryptographic package key included in the package record will not match the cryptographic key derived from the data stream, and access to the service will be denied.

The package record can also include first package cost data for the package. Second package cost data for the package is provided in the data stream. Access to the selected service is denied if the first and second package cost data do not represent the same package cost. In this manner, "pirates" are precluded from purchasing the packages at a lower cost than the packages are legitimately offered by the system operator. More particularly, the first package cost data can be used in deriving the portion of the cryptographic package key included in the package record. Similarly, the second package cost data would be used in deriving the cryptographic key from the data stream. If the same package cost data is not used in deriving both keys, the keys will not match and access to the services will be denied.

A package provider identification (PPID) can also be provided in the package record. The package provider identification allows each programmer (e.g., HBO, The Movie Channel, Disney channel, etc.) to define package identification values independently from one another. The PPID is provided for each service in the data stream that is part of the package, and is used in deriving the cryptographic key from the data stream for the service. The PPID provided in the package record is used in deriving the portion of the cryptographic package key included in the package record. Therefore, if the PPID for a selected service does not match the PPID stored in the corresponding package record, access will be denied because the portion of the cryptographic package key included in the package record will not match the corresponding portion of the cryptographic key derived from the data stream for the selected service.

As indicated above, an expiration count for the package can be commenced upon the purchase thereof. The expiration count can be maintained in the package record, and can be periodically decremented in response to a system clock. At the end of the defined time period, the package record can be invalidated. Invalidating the package record will free up valuable memory at the user terminal by allowing the package record to be overwritten.

Receiver apparatus in accordance with the invention allows consumers to purchase individual services or packages of services offered via an information network on an impulse basis. Interface means presents services and packages available for purchase to a user and enables the user to purchase at least one of the services or packages. Means are provided for opening a package record upon the purchase of one of the packages. The package record contains data that is unique to the purchased package. Secure processor means are provided. The secure processor means are responsive to (i) said interface means, (ii) said package record and (iii) access data communicated with the desired service, for providing cryptographically secure access to services available via the purchased package only during a defined time period over which the package is valid.

The apparatus can further comprise means for commencing an expiration count based on an available time reference. The expiration count precludes the package record from being overwritten by another record until the end of the defined time period. Means can be provided for updating the expiration count on a periodic basis. Means can also be provided for maintaining the expiration count as part of the package record.

In an illustrated embodiment, the package record includes a cryptographic package key (which can be a portion of a longer key used elsewhere in the system). The services are carried in a data stream on the information network. Means are provided for deriving a cryptographic key from the data stream. Means are also provided for denying access to a service selected by a user via the user interface if the cryptographic package key included in the package record does not match a corresponding cryptographic key derived from the data stream.

The package record can include a package identifier. The same package identifier is provided for each service in the data stream that is part of the package. The package identifier provided in the package record is used in deriving the cryptographic package key included in the package record. Similarly, the package identifier provided for the service selected by the user is used in deriving the cryptographic key from the data stream. If the same package identifier is not present in both the package record and the data stream for the selected service, access to the service will be denied because the resultant cryptographic keys will not match.

First package cost data is provided in the package record for the package. Second package cost data is provided in the data stream carrying the services available via the package. Means are provided for denying access to the selected service if the first and second package cost data do not represent the same package cost. More particularly, the first package cost data can be used to derive the cryptographic package key included in the package record. The second package cost data is similarly used in deriving the cryptographic key from the data stream. If there is any difference between the first and second package cost data, the resultant cryptographic keys will not match and access to the service will be denied.

A package provider identification (PPID) can be provided in the package record. The PPID is provided for each service in the data stream that is part of the package. The PPID provided in the package record is used in deriving the cryptographic package key included in the package record. The PPID provided for the service selected by the user is used for deriving the cryptographic key from the data stream. Any differences in the PPID provided in the package record and in the data stream for the selected service will preclude access to that service.

The apparatus of the invention can further comprise means for invalidating the package record at the end of the defined time period. By invalidating the record, the space used in memory to maintain that record is freed for other uses.

DETAILED DESCRIPTION OF THE INVENTION

Figure 1:
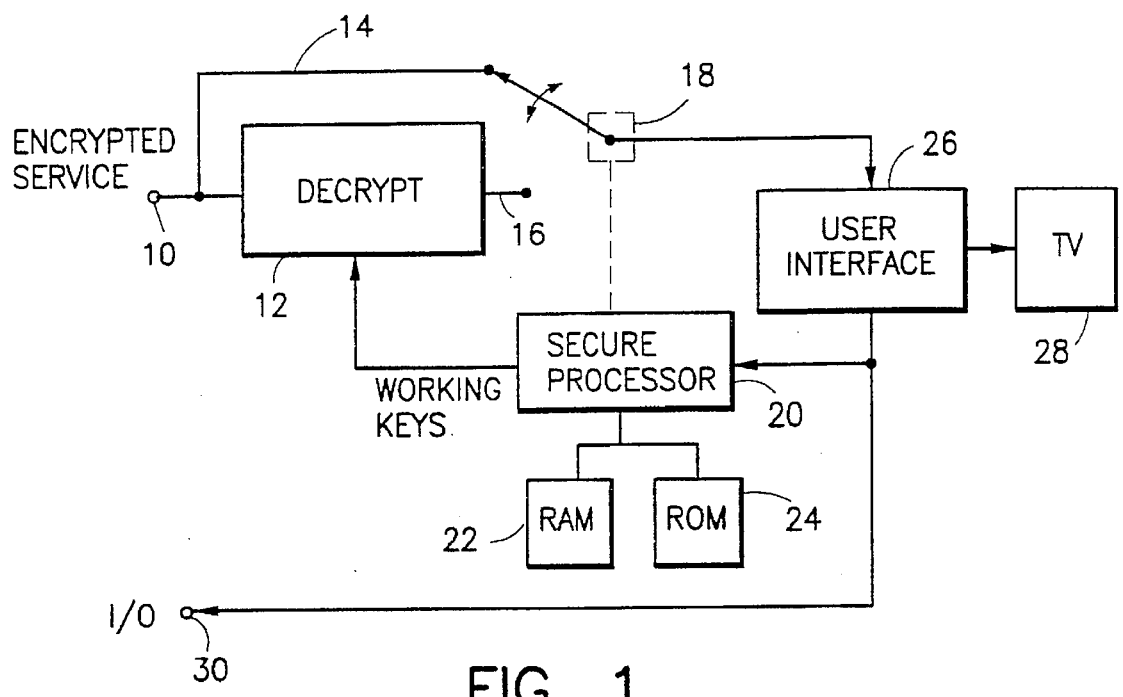
FIG. 1 is a block diagram of decoder apparatus in accordance with the present invention.

FIG. 1 illustrates, in block diagram form, the decryption portion of a digital satellite receiver, cable television receiver, or the like. An encrypted service (e.g., a premium television service) is input to terminal 10. By the time the bitstream comprising the service is input to terminal 10, it has already been received and demodulated from the communication channel over which it is transmitted, using conventional techniques. The encrypted service is decrypted by a decryption processor 12 in order to provide a clear signal at output 16 of the decryption processor.

The decryption processor can utilize a conventional decryption scheme, such as that disclosed in Gilhousen, et al. U.S. Pat. No. 4,613,901 entitled "Signal Encryption and Distribution System for Controlling Scrambling and Selective Remote Descrambling of Television Signals," or Bennett, et al. U.S. Pat. No. 4,864,615 entitled "Reproduction of Secure Keys by Using Distributed Key Generation Data," both incorporated herein by reference. The decryption processor requires working keys (WK) in order to decrypt the signals input thereto via terminal 10. The working keys are generated by a secure processor 20 in response to control signals received via input/output (I/O) terminal 30. Firmware for the secure processor is stored in read only memory (ROM) 24. The secure processor is also provided with random access memory (RAM) 22 in a conventional manner. A secure portion of RAM 22 holds unit specific keys and/or seeds for use in decryption of a monthly key (also known as a "category key"), as discussed in greater detail in connection with FIG. 2.

A user interface 26 enables a viewer to select services for viewing on a television (TV) 28 or other display device such as a video monitor or personal computer, workstation, etc. The user interface and output display can be referred to as a "user terminal," and can be separate devices or one integrated unit. If a user is authorized to receive a selected service by subscription, individual purchase (e.g., pay-per-view) or package purchase, secure processor 20 will actuate switch 18 to couple the decrypted output 16 from decryption processor 12 to the TV 28 via user interface 26. Otherwise, the user interface and TV will only receive the encrypted signal via line 14 and switch 18. Other switched and switchless arrangements serving a comparable function can be substituted for the implementation illustrated in FIG. 1.

Figure 2:
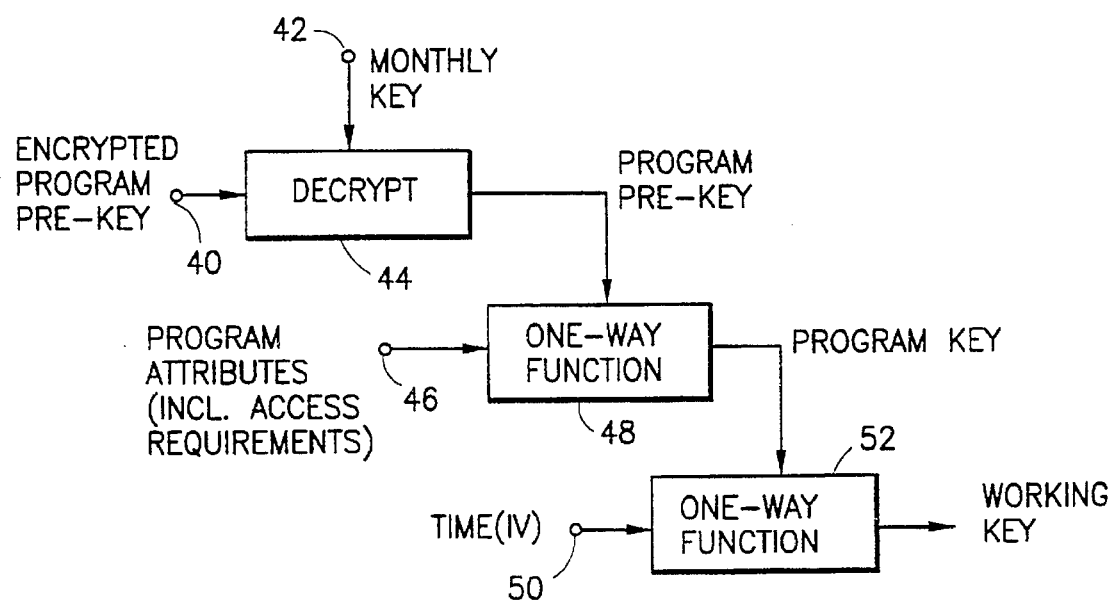
FIG. 2 is a block diagram illustrating a decryption hierarchy used to decrypt signals in an information network such as a cable or satellite television system.

A typical key hierarchy is illustrated in FIG. 2. An encrypted program pre-key is input via terminal 40 to a decryption function 44 which also receives a monthly key via terminal 42. The program pre-key is unique to each encrypted program offering (e.g., television program) that is available for decryption. The monthly key is changed on a periodic basis, e.g., once each month. The decryption function 44 decrypts the encrypted program pre-key to provide a program pre-key that is used as one input to a one way function 48. The other input to one way function 48 comprises various program attributes, including access requirements or "tiers," for the corresponding program. The access requirements (including, e.g., data such as a program or package ID, program or package tier, program or package cost, etc.) must be met in order to obtain authorization to view the program. The program attributes are input via terminal 46, and the one way function processes the program pre-key and program attributes to provide a program key. Since the access requirements are authenticated by one way function 48, none of these requirements can be altered without altering the program key that is used to generate the working keys for decrypting the program. If the program key used to decrypt differs from the one used to encrypt, decryption will fail.

The program key output from one way function 48 is used as one input to another one way function 52 that also receives, via terminal 50, an initialization vector (IV) representative of time. The processing of the initialization vector and program key by one way function 52 generates the working keys required by decryption processor 12 (FIG. 1) to decrypt the service selected by an authorized user. A further description of the generation of the various keys, including working keys (provided in a "keystream"), can be found in the aforementioned Bennett, et al. patent.

In a secure communication system such as the VideoCipher and DigiCipher satellite television systems provided by General Instrument Corporation of Chicago, Ill., U.S.A., each individual program is transmitted with a "program rekey" message. The program rekey message in each impulse pay-per-view (IPPV) program includes a single IPPV cost. IPPV costs, along with the program's tier mask and other quantities, are included in the program key generators so that any attempt to alter these quantities results in the generation of an unusable program key. Thus, any alteration will preclude the generation of proper working keys and the program will not be properly decrypted.

In order to provide the program package impulse purchase of the present invention, the program rekey of each program to be included in a package is provided with various additional program generator quantities. These are a package provider identification (PPID), a program package ID, the package cost, the package IPPV tier, and the package duration. Since a particular program can be bundled in a variety of different packages, the program rekey message for a particular program may contain a plurality of program package IDs. Similarly, where a program is included in various packages, the package cost for each of the different packages will be included in that program's program rekey message. In other words, one package cost will be provided for each program package ID. Similarly, one package IPPV tier and one package duration will be provided for each PPID contained in a particular program's program rekey message.

The PPID is included in order to allow each programmer to define package ID values independently from one another. For simplicity, it is possible to define a single "package IPPV" tier which enables impulse purchase of packages, rather than identifying an individual tier for each package. In an implementation where programs are offered at a daily rate and at a weekly rate, a first package ID could quote the cost of programs offered at the daily rate, and all programs within a given day would quote that package ID. A second package ID would be used for weekly package options. All programs for the week would quote the second package ID. Additional package IDs would be provided for other durations and combinations of services within a package.

The presentation of the various package options to a user is provided via the user interface 26 and television (or other display) 28. The presentation can be in the form of menus, allowing a consumer to choose between several package purchase options. The generation of on-screen menus for IPPV purchases is well known. Information necessary to construct a particular menu screen is provided by a program information message and a text page associated with individual programs or a separate data stream offering the packages.

The secure processor 20 derives the authorization state of every program. In order to implement the impulse package purchasing feature of the present invention, the set of possible authorization states is enhanced (over implementations which only offer the IPPV purchasing of individual programs) to include, for each different package option, a state indicating "can buy" or "cannot buy." If the program state is already "subscribed" (for example, where a user is already a subscriber to the particular service such as HBO), then program packages for that service will not be offered. For a program package to be impulse purchasable, the requirements for individual IPPV purchases must be met. These "regular" requirements include enabling the subscriber's terminal for IPPV purchases, the receipt of the necessary reporting messages by the system operator (such messages comprising reports back to the operator via, e.g., a telephone connection in response to a polling request), and verifying that the number of programs purchased via IPPV since the last report back to the system operator has not exceeded a predefined limit. In addition to these regular requirements, the provision of impulse package purchasing in accordance with the present invention requires the user terminal to hold the appropriate package IPPV tier as well as a sufficient credit balance to finance the package purchase.

If a user elects to purchase a program package and supplies a proper password, the user terminal prepares a message to the secure processor indicating the program and package that should be purchased. The program is identified by a program event number and the package ID number. The user terminal then initiates a purchase procedure for that program package. In a preferred embodiment, the purchase procedure is indivisible, such that it will complete when power is restored if it is interrupted by a reset prior to completion.

In order to provide impulse purchasing of packages, a number of "package records" are stored by secure processor 20 for each package that is purchased. For example, each package record can be nine bytes long (plus a flag) and contain the three least significant bytes of a package key, a two-byte package ID, a two-byte expiration timer and a two-byte package provider ID (PPID). A one-bit record valid flag indicates whether the record is valid or not. This flag, when set, indicates that the record contents are valid. When the flag is clear, the record is currently undefined.

Figure 3:
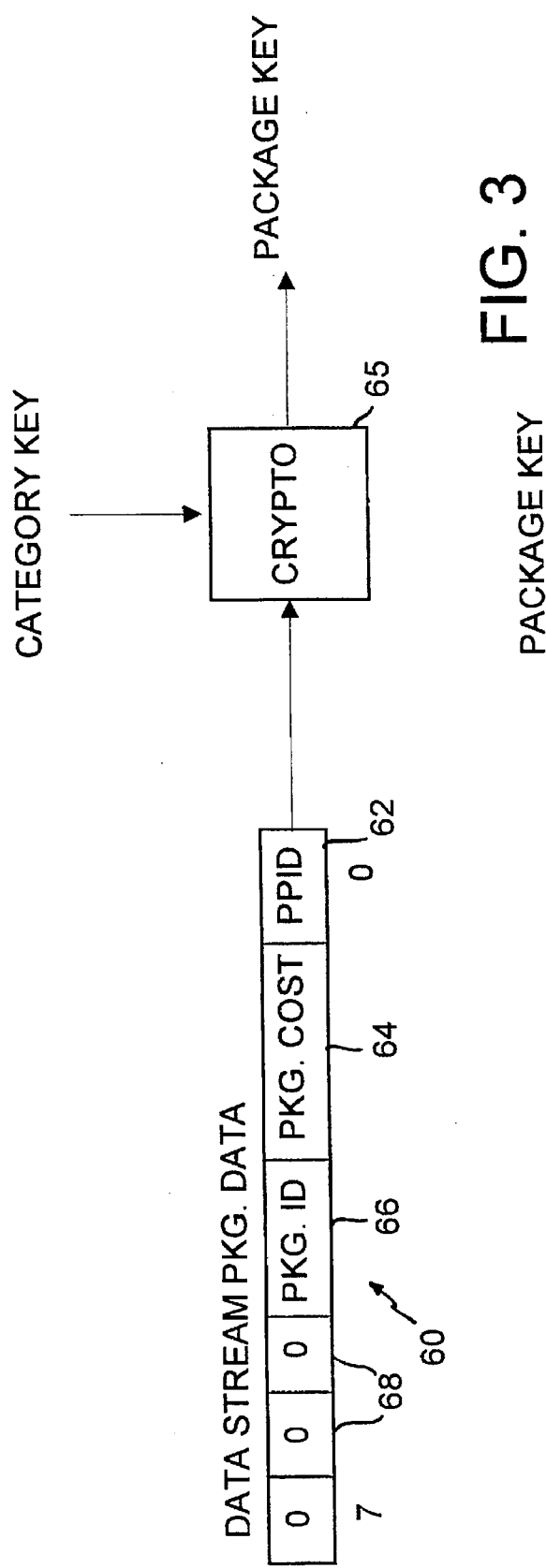
FIG. 3 is a diagrammatic illustration of the package key derivation used in connection with the present invention.

The package key is derived as illustrated in FIG. 3. The package data from an incoming data stream includes a "program rekey" message, an eight-bit portion 60 thereof containing information from which the package key is derived. The eight-byte portion 60 includes a one-byte PPID 62, two bytes of package cost data 64, and two bytes comprising the package ID 66. The remaining three bytes 68 are used for padding, and can comprise all zeros.

The eight-byte portion 60 is input to a cryptographic function 65 ("crypto") that is implemented in firmware and can comprise any crypto function, such as a well known hash function. A 64-bit category key is input to the crypto function and, e.g., hashed with the eight bytes of program rekey data 60 in order to provide a 64-bit package key. The category key used to derive the package key is specified by a category sequence number contained in the program rekey message carrying the package data. The generation and use of category keys for access control in communication systems such as satellite television systems is well known. In a typical system, the category key will be changed on a periodic basis, such as monthly, to heighten the system security.

As is evident from FIG. 3, the package key will embody the package ID, package cost and PPID information. It will also embody the package tier, through the PPID. While the package cost and tier could also be included in the package record that is generated upon the purchase of a package, it is not necessary to include this information in the package record in the clear (i.e., without encryption) since the information can be derived from the package key itself. The package ID and PPID, on the other hand, are included in the package record in the clear even though they are also embodied in the package key. The reason for this is to enable comparisons to be made between the respective package IDs and PPIDs embodied in the package key and stored locally in the package record with minimum cryptographic processing. Since individual programs within a package are located in the data stream by searching for the package ID and PPID in the incoming data stream on a real time basis, system expense and throughput could suffer if the package key stored in the package record had to be decrypted each time the package ID and PPID were required for program acquisition. Thus, the package ID and PPID are stored in the package record in the clear even though this same information could be derived from the stored portion of the package key.

It should be appreciated that a system could be implemented which uses less RAM by not storing the package ID and PPID in the package record. Such a system would require the crypto processor to derive package keys for each of the member packages in the incoming data stream to see if it could come up with a match with the portion of the package key stored in the package record at the user terminal. Such an implementation is not the preferred embodiment, however, since it could take a long time to compute all of the package keys for each of the member packages.

Figure 4:
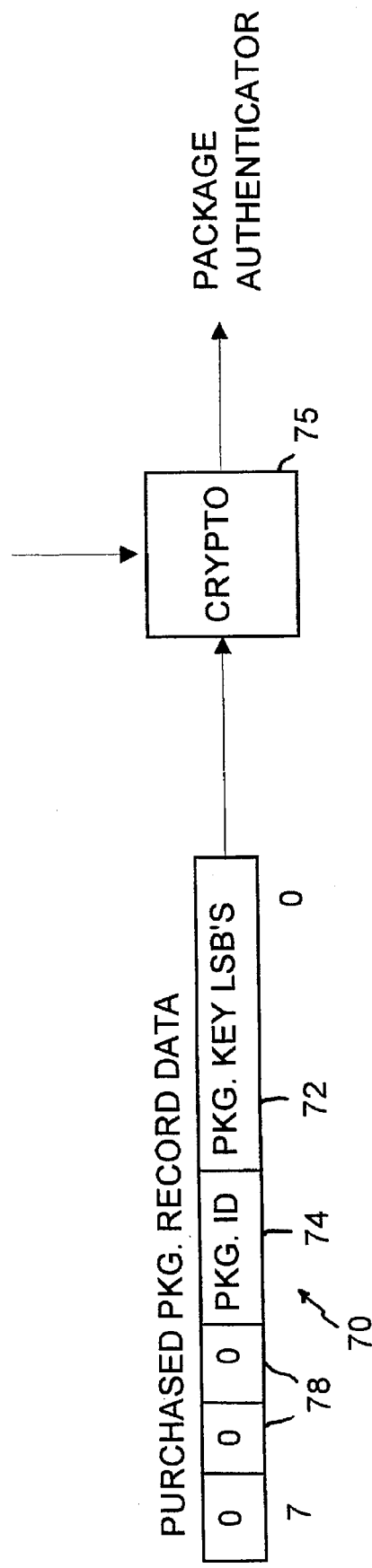
FIG. 4 is a diagrammatic illustration of the package authenticator derivation used in accordance with the present invention.

As noted above, the category key is periodically changed. Each individual category key remains valid over an "epoch" over which that category key is used. It is possible that packages will span different category epoch boundaries. In order to handle such an occurrence, packages which span category epoch boundaries are provided with an eight-byte package authenticator for services that occur after the category epoch in which the package starts. The package authenticator is used by the access control processor (i.e., secure processor 20—FIG. 1) to determine whether a package purchased in a prior category epoch may be considered to have been purchased in the following epoch. The derivation of the package authenticator is illustrated in FIG. 4.

As previously noted, each purchased package record will contain a portion of a package key, the package ID, an expiration timer and the PPID. For purposes of deriving the package authenticator, an eight-byte portion of the purchased package record data 70 is provided as one input to a cryptographic processor 75. The package record data portion 70 includes three bytes comprising the least significant bits 72 of the package key stored in the package record as well as two bytes comprising the package ID 74. The remaining three bytes 78 in the portion 70 are used for padding, and can comprise zeros. The twenty-four bits (three bytes) of the package key 72 embody the category key from when the package was purchased, i.e., the "previous category key" after a category epoch boundary has passed for a package which spans category epoch boundaries. The current category key is embodied in the current package key that is input to crypto 75 for use in deriving the package authenticator. Thus, the package authenticator will embody both the previous category key and the current category key after a category key epoch boundary has been passed for a particular package.

When the access control processor receives the first program rekey message at acquisition and is determining the authorization state of the user terminal, if no subscription tiers match, it will search through the bought program/purchase list stored at the user processor to attempt to find a match with programs carried by the incoming data stream. More particularly, an attempt is made to find a match between one of a plurality of package_ID tags that might be associated with a selected program, and a package ID found in an active bought package record.

If a package ID match is found, the access control processor will derive the package key as illustrated in FIG. 3. If the portion of the package key stored in the package record matches the corresponding portion of the key rederived from the incoming data stream, the program provided by that data stream is considered to be part of the purchased package. If the package key portions do not match, and the program rekey message includes a package authenticator, the access control processor will then take the full 64-bit package key derived from the incoming data stream as illustrated in FIG. 3, and derive the package authenticator as illustrated in FIG. 4. If that produces a match on all 64 bits of the authenticator provided in the incoming program rekey message, the access control processor will indicate a "bought package" authorization status for the user terminal.

If the package ID stored in a package record matches the package ID in the incoming data stream, but neither the package key nor the package authenticator matches, then that particular package data may be used by the user terminal access control processor to derive a "can buy" package authorization state. This can happen in a case where a package spans more than one category epoch, and the user terminal does not update the package purchase record in the prior category epoch.

An example of the format that can be used for the package data carried in the program rekey message is provided in Table 1, which sets forth the data block format in a C-language-like syntax that is a method of describing continuous and possible variable rate sequences of bits, instead of specifying a procedural program and its functions as in the computer language C. The first column of the syntax contains the syntax element. The second column gives the length of the syntax elements in bits. The third column of Table 1 gives the length of the syntax elements in bytes. The last column in Table 1 describes the information carried in various bits of the syntax element.

The header "package_data_structure( ){...}" indicates that the syntax elements within the braces are a named set and may be invoked elsewhere in the syntax by simply using the designation "package_data_structure( )". A conditional occurrence of bit structures may be indicated with the usual "if" tests. The customary relational operators well known in the C-language are also available. Loop structures are possible and use the standard C loop header syntax. The syntax table is accompanied by a set of semantics, providing definitions for each previously undefined syntax field and placing constraints on their use. The following package_data_structure( ) record format represents a preferred embodiment of the present invention:

TABLE 1

| | Bits | Bytes | Bit Number/ Description |
|---|---|---|---|
| package_data_structure(){ | | | |
| package_provider_ID | 8 | 1 | |
| package_count_byte | 8 | 1 | |
| reserved | 5 | | 7-3: reserved |
| package_count | 3 | | 0-2: range (1-7) |
| for(i=0; i<package_count; i++){ | | | |
| package_ID | 16 | (2) | |
| package_cost | 16 | (2) | |
| } | | | |
| for(i=0; i<package_count; i++){ | | | |
| package_end_time | 24 | (3) | units: WKE |
| } | | | |
| for(i=0; i<package_count; i++){ | | | |
| package_authenticator_included_byte | 8 | (1) | |
| package_authenticator_included | 1 | | 7: {no, yes} |
| reserved | 7 | | 6-0: reserved |
| if(package_authenticator_included){ | | | |
| package_authenticator | 8*8 | ((8)) | |
| } | | | |
| } | | | |
| } | | | | package_provider_ID: An 8-bit unsigned integer value which uniquely defines the entity defining the package_ID values in this message. The package_provider_ID taken together with a package_ID must constitute a unique identification of a program package across the entire system.

package_count: A value in the range 1 through 7 which defines the number of program packages associated with this program.

package_ID: A 16-bit tag used to group programs into packages. All programs associated with a particular package are identified with a common package ID. Package IDs must be uniquely defined for all programs with a common package_provider_ID.

package_cost: Defines the cost in units, of the package identified by the preceding package_ID field.

package_end_time: Defines the working key epoch count of the last working key period of the last program of the package. This field is used by the decoder to expire the purchased package record.

package_authenticator_included: A Boolean flag which indicates, when set, that an 8-byte package authenticator is defined for this package. When the flag is clear, no authenticator is defined for this package. No authenticator is required unless the package originated in a prior category epoch.

package_authenticator: An 8-byte authentication key used by the access control processor (ACP) 102 (FIG. 5) to determine whether a package purchased in a prior category epoch may be viewed in this epoch.

Figure 5:
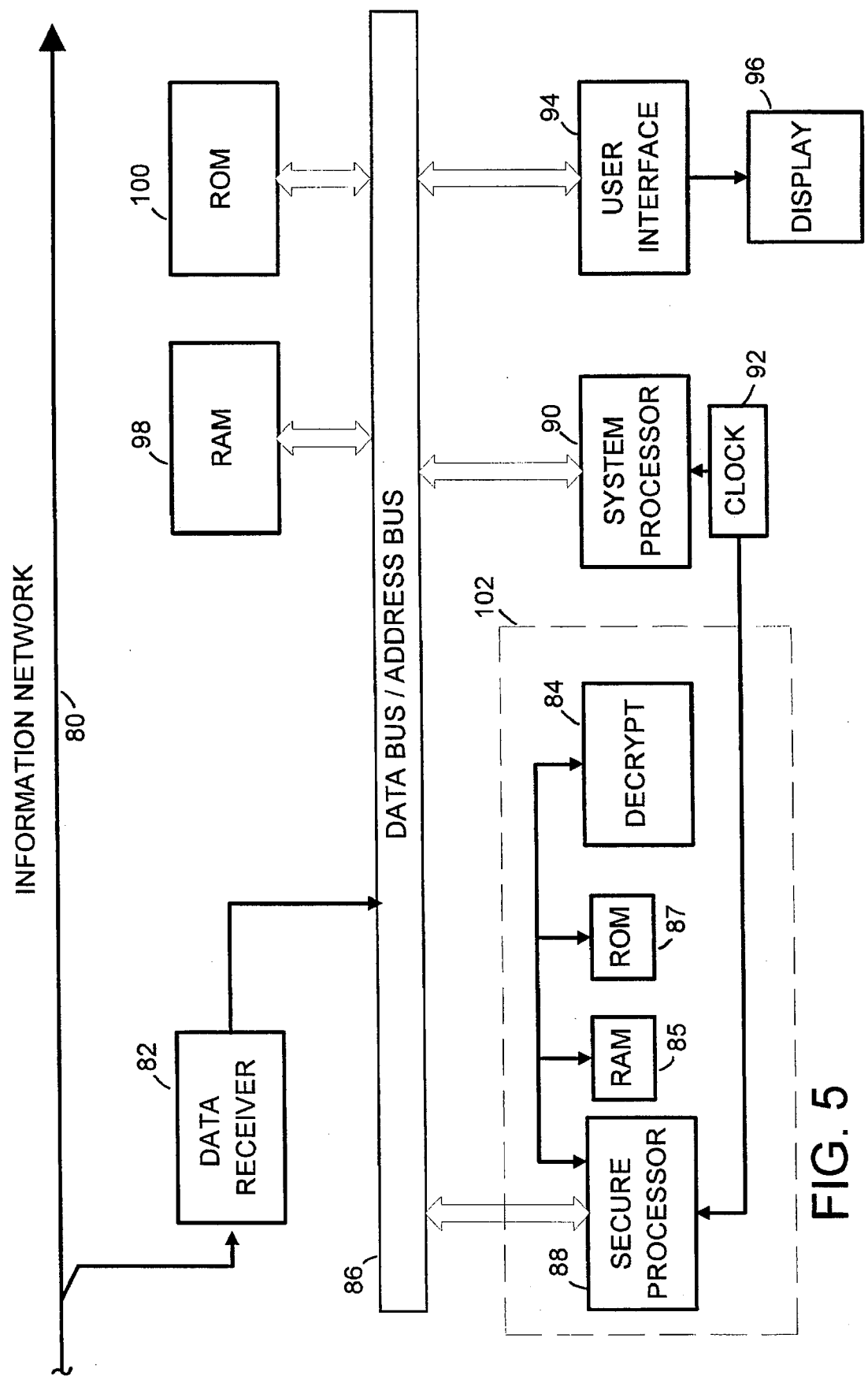
FIG. 5 is a more detailed block diagram of the decoder components that provide access to signals from which packaged services are recovered.

FIG. 5 illustrates an implementation of the user terminal components which provide package purchases in somewhat greater detail than set forth in FIG. 1. An information network 80 carries various services and control data which can be received by a data receiver 82 of a particular user terminal coupled to the information network. The user terminal is provided with conventional data and address buses 86 illustrated together for purposes of simplicity in FIG. 5. Decryption is provided by ACP 102 which includes a decryption processor 84 coupled to a secure processor 88 to provide the access control functions. Secure RAM 85 and ROM 87 are provided in the ACP in a well known manner.

A system processor 90 governs the overall operation of the user terminal. The system processor and secure processor are synchronized via a system clock 92. RAM 98 and ROM 100 are provided for use by the system processor 90.

A user interfaces with the terminal via a user interface 94, that can comprise a remote control with key switches, a keyboard, a voice activated interface or any other known interface. Display 96 provides display of services and program signals as well as a menu to enable the user to choose services for purchase and presentation.

Once a purchase operation initiated by the user is completed, an account balance (credit total−debit total) maintained in RAM 98 is decreased by the package cost. The account balance is specific to the user terminal, and indicates how much credit is left from a sum of money deposited by the user with the system operator. The credit total and debit total from which the account balance is calculated are maintained in a cumulative manner over the life of the terminal. A "purchase count," which indicates the number of purchases made by the user over the life of the terminal, is incremented by one upon the completion of a package purchase. The purchase count is also maintained in RAM 98. At the same time, the system processor 90 will have recorded the purchase in the "interpreted view history stack," which maintains a history of purchases for display to the user, and the record valid flag for the package record will be set. The authorization state for the package will be set to "purchased."

If the user tunes away from a service provided in a purchased package, and then returns to a service (i.e., television program) that is part of the purchased package, the secure processor 88 will, upon return to the program, search an array of bought packages to attempt to find a match between one of the package purchase options in the program rekey message and one of the valid purchased package records. All authenticated parameters must match for the "purchased" state to result.

A user can purchase either individual services or packages of services. In the past, where only the purchase of individual services was provided, the user terminal would only hold a small number of "bought" program records. If the user returned to a program previously purchased, its record would be found within a stored array of program records, unless too many additional programs had been purchased in the meantime and overwritten the record of the program to which the user is attempting to return. For package purchases in accordance with the present invention, a purchased package may span a relatively long period, such as a week or more. Overwriting package records cannot be tolerated, as the user's entitlement to a large number of subsequent services may be destroyed by overwriting a package record. In order to prevent the overwriting of package records, the program rekey message provides the end time of each package, expressed in units of working key epochs (WKE's). As noted in the discussion of FIG. 2, above, working keys are generated in order to allow authorized subscribers to access particular services. Each service is provided during a corresponding epoch. The epoch for the service is divided into a plurality of working key epochs, which may, for example, occur at a rate of eight WKE's per second, or at any other interval that is desired for a given implementation of the system.

When a package purchase is made, secure processor 88 will use the end time and the current WKE count to compute an expiration timer (e.g., 16 bits). The expiration timer will be recorded with the package record. In an example embodiment, the most significant byte of the counter is hours, and the least significant byte is in units of 1/256 hour, which is equivalent to about 14 seconds. In real time, even if no signal is currently acquired, the countdown timers for all active records will be decremented every 1/256 hour. When the count on a particular record reaches zero, that record is invalidated and becomes available to be used by future purchases. The expiration timer is provided to help ensure that a package that has been purchased will not under any circumstances require the user to repurchase it.

Figure 6:
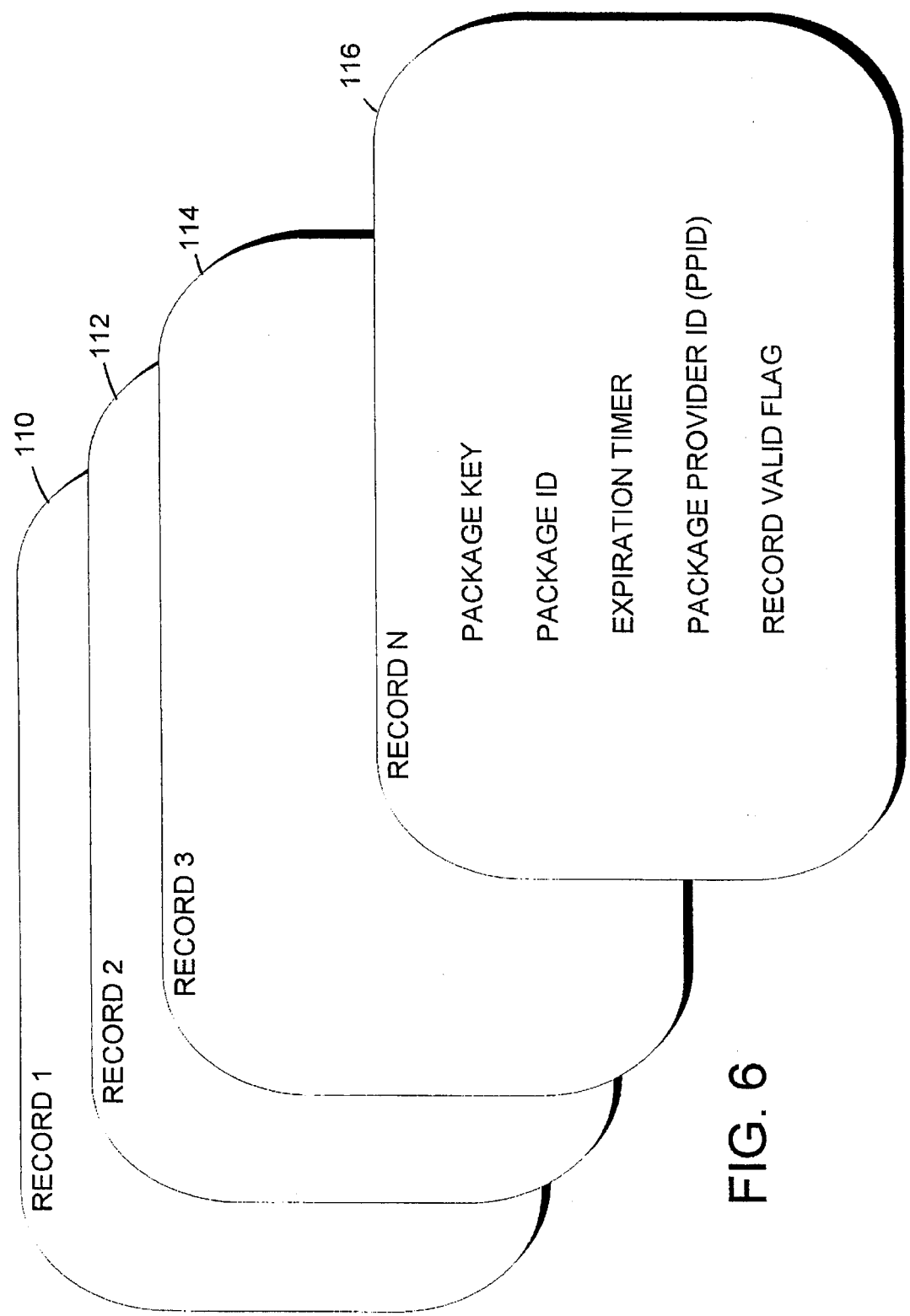
FIG. 6 is a diagrammatic illustration of various package records that are maintained in accordance with the present invention.

FIG. 6 illustrates a number of purchased package records that can be stored in RAM 98. Each of the records 110, 112, 114 and 116 will include at least a portion of the package key, the package ID, the expiration timer, the PPID, and a record valid flag. Each of these components of the package records has been discussed above. At the termination of a package, the record for that package will be invalidated by clearing the record valid flag. That record will then be available for reuse by another purchase.

It should now be appreciated that the present invention provides a method and apparatus for allowing consumers to purchase packages of services on an impulse basis over an information network. A package record is established for access by a user terminal upon purchase of a package. The package record provides cryptographically secure access to services provided in the package during a defined time period over which the package is valid.

Although the invention has been described in connection with various specific embodiments, it should be appreciated that various adaptations and modifications may be made thereto without departing from the spirit and scope of the invention as set forth in the claims.

We claim:

1. A method for providing packages of information services to consumer terminals via an information network on an impulse purchase basis, comprising the steps of:

providing a consumer interface terminal coupled to said information network for allowing a consumer to individually purchase on impulse a plurality of said information services;

wherein said interface terminal further allows the consumer to purchase said plurality of services as a package which comprises selected ones of said information services, said package providing said selected services over a defined time period;

providing a cryptographic key which is associated with said selected information services; and establishing a package record for access by said consumer terminal upon a purchase of said package; wherein:

said package record includes at least a portion of a cryptographic package key; and said package record provides access to said package services only during said defined time period and on a conditional basis according to at least a portion of said associated cryptographic key and said portion of said cryptographic package key.

2. A method in accordance with claim 1 wherein said package record is established and maintained at said user terminal.

3. A method in accordance with claim 2 comprising the further step of:

commencing an expiration count for said package upon the purchase thereof, said expiration count being based on an available time reference and precluding the package record from being overwritten by another record until the end of said defined time period.

4. A method in accordance with claim 2 wherein:

said services are carried in a data stream on said information network;

said method comprising the further steps of:

deriving said cryptographic key from said data stream; and denying access to said package services if the portion of said cryptographic package key included in said package record does not match a corresponding portion of the cryptographic key derived from said data stream.

5. A method in accordance with claim 4 wherein:

said package record includes a package identifier;

said package identifier is provided for each service in said data stream that is part of said package;

said package identifier provided in said package record is used in deriving the portion of said cryptographic package key included in the package record; and the package identifier provided for the package services selected by the consumer is used in deriving said cryptographic key from said data stream.

6. A method in accordance with claim 5 wherein:

first package cost data for said package is provided in said package record;

second package cost data for said package is provided in said data stream; and access to the selected package services is denied if the first and second package cost data do not represent the same package cost.

7. A method in accordance with claim 6 wherein said first package cost data is used in deriving the portion of said cryptographic package key included in said package record and said second package cost data is used in deriving said cryptographic key from said data stream.

8. A method in accordance with claim 7 wherein:

a package provider identification (PPID) is provided in said package record;

said PPID is provided for each service in said data stream that is part of said package;

said PPID provided in said package record is used in deriving the portion of said cryptographic package key included in the package record; and the PPID provided for the selected package services is used in deriving said cryptographic key from said data stream.

9. A method in accordance with claim 8 comprising the further step of:

commencing an expiration count for said package upon the purchase thereof, said expiration count being based on an available time reference and precluding the package record from being overwritten by another record until the end of said defined time period.

10. A method in accordance with claim 9 wherein said package record includes said expiration count.

11. A method in accordance with claim 1 comprising the further step of:

invalidating said package record at the end of said defined time period.

12. A method in accordance with claim 1 wherein said information services comprise at least one of television, computer network, entertainment, database, banking and shopping services.

13. Receiver apparatus for allowing consumers to purchase individual information services or packages comprising selected ones of said services via an information network on an impulse basis, said selected services being associated with a cryptographic key, said apparatus comprising:

interface means for allowing a consumer to purchase at least one of said individual services and said packages of services;

means responsive to said interface means for opening a package record upon the purchase of one of said packages, said package record containing data that is unique to said purchased package;

said package record including at least a portion of a cryptographic package key; and secure processor means responsive to (i) said interface means, (ii) said package record and (iii) access data communicated with said desired service, for providing access to services available via said purchased package only during a defined time period over which said package is valid and on a conditional basis according to at least a portion of said associated cryptographic key and said portion of said cryptographic package key.

14. Apparatus in accordance with claim 13 further comprising:

means for commencing an expiration count for said package upon the purchase thereof, said expiration count being based on an available time reference and precluding the package record from being overwritten by another record until the end of said defined time period.

15. Apparatus in accordance with claim 14 further comprising:

means for updating said expiration count on a periodic basis; and means for maintaining said expiration count as part of said package record.

16. Apparatus in accordance with claim 13 wherein:

said services are carried in a data stream on said information network;

said apparatus further comprising:

means for deriving said cryptographic key from said data stream; and means for denying access to a package service selected by a consumer via said interface if the portion of said cryptographic package key included in said package record does not match a corresponding portion of the cryptographic key derived from said data stream.

17. Apparatus in accordance with claim 16 wherein:

said package record includes a package identifier;

said package identifier is provided for each service in said data stream that is part of said package;

said package identifier provided in said package record is used in deriving the portion of said cryptographic package key included in the package record; and the package identifier provided for the package services selected by the consumer is used in deriving said cryptographic key from said data stream.

18. Apparatus in accordance with claim 17 wherein:

first package cost data for said package is provided in said package record;

second package cost data for said package is provided in said data stream; and means are provided for denying access to the selected package services if the first and second package cost data do not represent the same package cost.

19. Apparatus in accordance with claim 18 wherein said first package cost data is used in deriving the portion of said cryptographic package key included in said package record and said second package cost data is used in deriving said cryptographic key from said data stream.

20. Apparatus in accordance with claim 19 wherein:

a package provider identification (PPID) is provided in said package record;

said PPID is provided for each service in said data stream that is part of said package;

said PPID provided in said package record is used in deriving the portion of said cryptographic package key included in the package record; and the PPID provided for the service selected by the user is used in deriving said cryptographic key from said data stream.

21. Apparatus in accordance with claim 13 further comprising: means for invalidating said package record at the end of said defined time period.

22. Apparatus in accordance with claim 13 wherein said information services comprise at least one of television, computer network, entertainment, database, banking and shopping services.

* * * * *